US012718547B2

(12) United States Patent
Dingmann

(10) Patent No.: US 12,718,547 B2
(45) Date of Patent: Aug. 25, 2026

(54) IMAGE RECOGNITION IN TEST SYSTEMS

(71) Applicant: TA Instruments-Waters LLC, New Castle, DE (US)

(72) Inventor: David L. Dingmann, Saint Paul, MN (US)

(73) Assignee: TA Instruments-Waters LLC, New Castle, DE (US)

( * ) Notice: Subject to any disclaimer, the term of this patent is extended or adjusted under 35 U.S.C. 154(b) by 0 days.

(21) Appl. No.: 18/541,947

(22) Filed: Dec. 15, 2023

(65) Prior Publication Data

US 2024/0125682 A1 Apr. 18, 2024

Related U.S. Application Data

(63) Continuation of application No. 17/150,154, filed on Jan. 15, 2021, now Pat. No. 11,846,610.
(Continued)

(51) Int. Cl.
*G06V 10/00* (2022.01)
*G01N 3/06* (2006.01)
(Continued)

(52) U.S. Cl.
CPC ............. *G06V 10/82* (2022.01); *G01N 3/068* (2013.01); *G06N 3/04* (2013.01); *G06N 3/08* (2013.01); *G06T 7/0004* (2013.01); *G06T 2207/20081* (2013.01); *G06T 2207/20084* (2013.01); *G06T 2207/30164* (2013.01)

(58) Field of Classification Search
CPC .......... G06V 10/82; G01N 3/068; G01N 3/04; G01N 2203/0647; G06N 3/04; G06N 3/08; G06T 7/0004; G06T 2207/20081; G06T 2207/20084; G06T 2207/30164; B23Q 17/2476
See application file for complete search history.

(56) References Cited

U.S. PATENT DOCUMENTS

2004/0170315 A1 9/2004 Kosaka et al.
2015/0332463 A1* 11/2015 Galera .................... H04N 7/18
382/103

(Continued)

FOREIGN PATENT DOCUMENTS

| | | | |
|---|---|---|---|
| CN | 103674737 | A | 3/2014 |
| JP | 2002-365188 | A | 12/2002 |
| KR | 20070098049 | A | 10/2007 |

OTHER PUBLICATIONS

"Electroforce® Load Frame and Testbench Instruments," TA Instruments, brochure, 2019.

(Continued)

*Primary Examiner* — Ping Y Hsieh
(74) *Attorney, Agent, or Firm* — Schmeiser Olsen, PLLC

(57) ABSTRACT

Described are systems and methods for image recognition in test systems. A method for safe operation of a test system includes capturing image data representative of a test area of the test system with an imaging device, transmitting the image data representative of the test area from the imaging device to a processor running an image recognition application, detecting, by the image recognition application, a user presence within the test area, and adjusting the test system to a safe mode in response to the detecting the user presence within the test area.

22 Claims, 12 Drawing Sheets

Related U.S. Application Data

(60) Provisional application No. 62/964,277, filed on Jan. 22, 2020.

(51) Int. Cl.

| | |
|---|---|
| ***G06N 3/04*** | (2023.01) |
| ***G06N 3/08*** | (2023.01) |
| ***G06T 7/00*** | (2017.01) |
| ***G06V 10/82*** | (2022.01) |

(56) References Cited

U.S. PATENT DOCUMENTS

| | | | | |
|---|---|---|---|---|
| 2019/0041811 | A1 | 2/2019 | Drees | |
| 2020/0072413 | A1* | 3/2020 | Stoppenbrink .... | B23Q 11/0082 |
| 2020/0074616 | A1 | 3/2020 | Al Shehri et al. | |
| 2021/0186450 | A1* | 6/2021 | Vancamberg .......... | A61B 6/584 |

OTHER PUBLICATIONS

International Search Report & Written Opinion in PCT/US2021/013589 mailed on Apr. 29, 2021.

International Preliminary Report on Patentability in International Patent Application No. PCT/US2021/013589 mailed on Aug. 4, 2022.

Non-Final Office Action in U.S. Appl. No. 17/150,154 mailed on Mar. 15, 2023.

Notice of Allowance in U.S. Appl. No. 17/150,154 mailed on Aug. 2, 2023.

* cited by examiner

Bend Fixture (image 1)

Compresion Fixture (image2)

High resolution image

Low resolution (4 x 4) version of the images

Low resolution image overlaid with pixel values.

| | x1 | x2 | x3 | x4 | x5 | x6 | x7 | x8 | x9 | x10 | x11 | x12 | x13 | x14 | x15 | x16 |
|---|---|---|---|---|---|---|---|---|---|---|---|---|---|---|---|---|
| Bend | 1 | 0 | 0 | 1 | 2 | 3 | 3 | 2 | 0 | 6 | 6 | 0 | 0 | 4 | 4 | 0 |
| Compression | 0 | 0 | 0 | 0 | 0 | 2 | 2 | 0 | 0 | 6 | 6 | 0 | 0 | 4 | 4 | 0 |

FIG. 7

```
import numpy as np
from keras.models import load_model
from PIL import Image

def preprocessImage(img,imgDims):
        img = img.resize(imgDims[2:3],resample=3)
        imgArr = np.array(img)
        imgArr = np.resize(imgArr,imgDims)
        return imgArr

def loadDataFile(fixtureClass):
    if fixtureClass == 0:
        return 0
                # load Bend test file
    elif fixtureClass == 1:
                # load Compression test file
        return 1
    elif fixtureClass == 2:
                # load Tension test file
        return 2
    elif fixtureClass == 3:
                # load Shear test file
        return 3
    elif fixtureClass == 4:
                # warn on no fixture in place
        return 4
    else:
                # warn on fixture not identified.
        return -1



classes = ("Bend","Compression","Tension","Shear","Empty")
imgSize = 224;
imgDims = (1,3,imgSize,imgSize)
model = load_model('fixture_id.h5')

img = Image.open('firstFixture.jpg')
img_arr = preprocessImage(img,imgDims)

firstCls = model.predict_classes(img_arr)





if firstCls==secondCls:
        loadDataFile(firstCls)
        print("Fixture is " + classes[firstCls])
else:
        # Call error on mismatching fixtures
        print("Fixutres do not match")
```

FIG. 12

IMAGE RECOGNITION IN TEST SYSTEMS

RELATED APPLICATION

This application is a continuation of U.S. patent application Ser. No. 17/150,154 filed Jan. 15, 2021 and titled "Fixture Identification in Test Systems" which claims the benefit of the earlier filing date of U.S. Provisional Patent Application Ser. No. 62/964,277 filed Jan. 22, 2020 and titled "Fixture Identification in Test Systems," the entireties of which are incorporated herein by reference.

FIELD OF THE INVENTION

The invention relates generally to image recognition for test systems. More specifically, the invention relates to systems and methods for image identification for safety in test systems.

BACKGROUND

Test systems including mechanical testing equipment may use an actuator to apply a load or force towards, or otherwise agitate, a sample specimen or material. For example, some testing applications involve pushing or pulling a sample with the actuator and measuring the generated deflection and load.

SUMMARY

In an aspect of the present disclosure, a method for safe operation of a test system is described. The method may include capturing image data representative of a test area of the test system with an imaging device. The method may further include transmitting the image data representative of the test area from the imaging device to a processor running an image recognition application. The method may also include detecting a user presence in the test area based on the image data with the processor running the image recognition application.

One or more of the following features may be included. The method may include, in response to detecting the user presence in the test area of the test system, adjusting the test system to a safe mode. The method may also include, in response to detecting the user presence in the test area of the test system, providing an indication that the user presence has been detected in the test area of the test system. The indication may include a notification on a graphical user interface of the test system. The method may further include detecting that the user presence is no longer in the test area based on the image data with the processor running the image recognition application. Additionally, the method may include, in response to detecting the user presence is no longer in the test area of the test system, adjusting the test system out of the safe mode. The imaging device may be a camera.

BRIEF DESCRIPTION OF THE DRAWINGS

The above and further advantages of the present disclosure may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

FIG. 7 depicts a chart showing images of fixtures at various resolutions in accordance with aspects of the present disclosure.

FIG. 12 depicts an example implementation in accordance with aspects of the present disclosure.

DETAILED DESCRIPTION

Reference in the specification to "one embodiment" or "an embodiment" means that a particular feature, structure or characteristic described in connection with the embodiment is included in at least one embodiment of the teaching. References to a particular embodiment within the specification do not necessarily all refer to the same embodiment.

As described above, certain test applications for test systems may require knowing what type of tool or fixture was used to agitate a specimen. Thus, it may be beneficial to know a fixture geometry for the type of fixture that was used in the test system, or know the type of fixture itself. Using the techniques and features described in the present disclosure image recognition and artificial intelligence, including machine learning or neural networks, may be used to identify fixtures which are loaded, installed, or otherwise used in test systems.

Applications of test systems including mechanical testing equipment may involve pushing and/or pulling of a sample or specimen with an actuator and measuring resulting deflection. Applications of test systems may also include measuring how much load is applied to the sample or specimen. Knowing what type of fixture or tool was used to push or pull the sample or specimen may be an element of turning measurements of deflection, displacement, and/or load into useful information such as a stress and strain of the sample or specimen. Having knowledge of the geometry of the fixture may help with unit conversions to calculate useful information.

Figure 1:
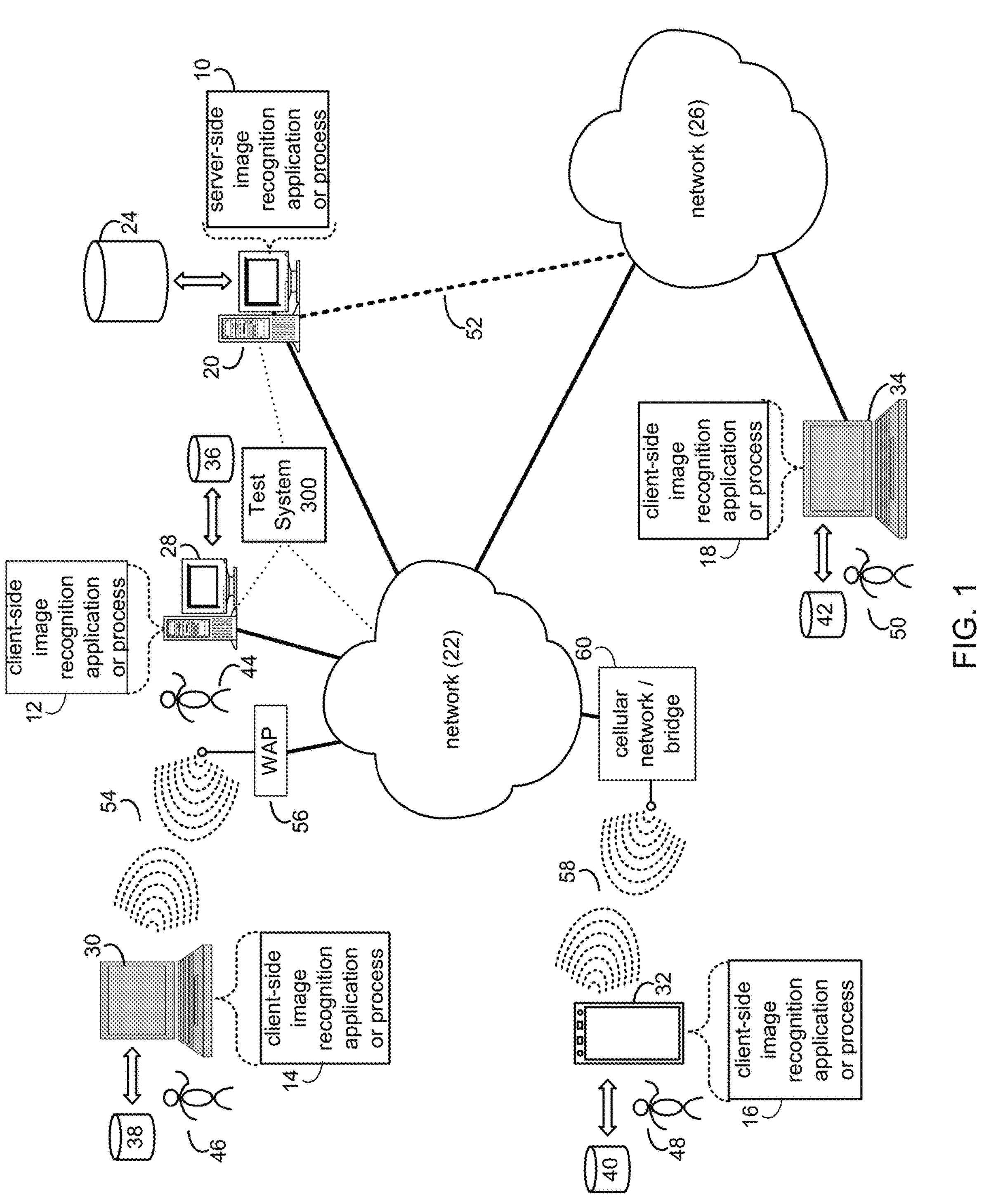
FIG. 1 depicts an example system that can execute aspects of the present disclosure.
Figure 3:
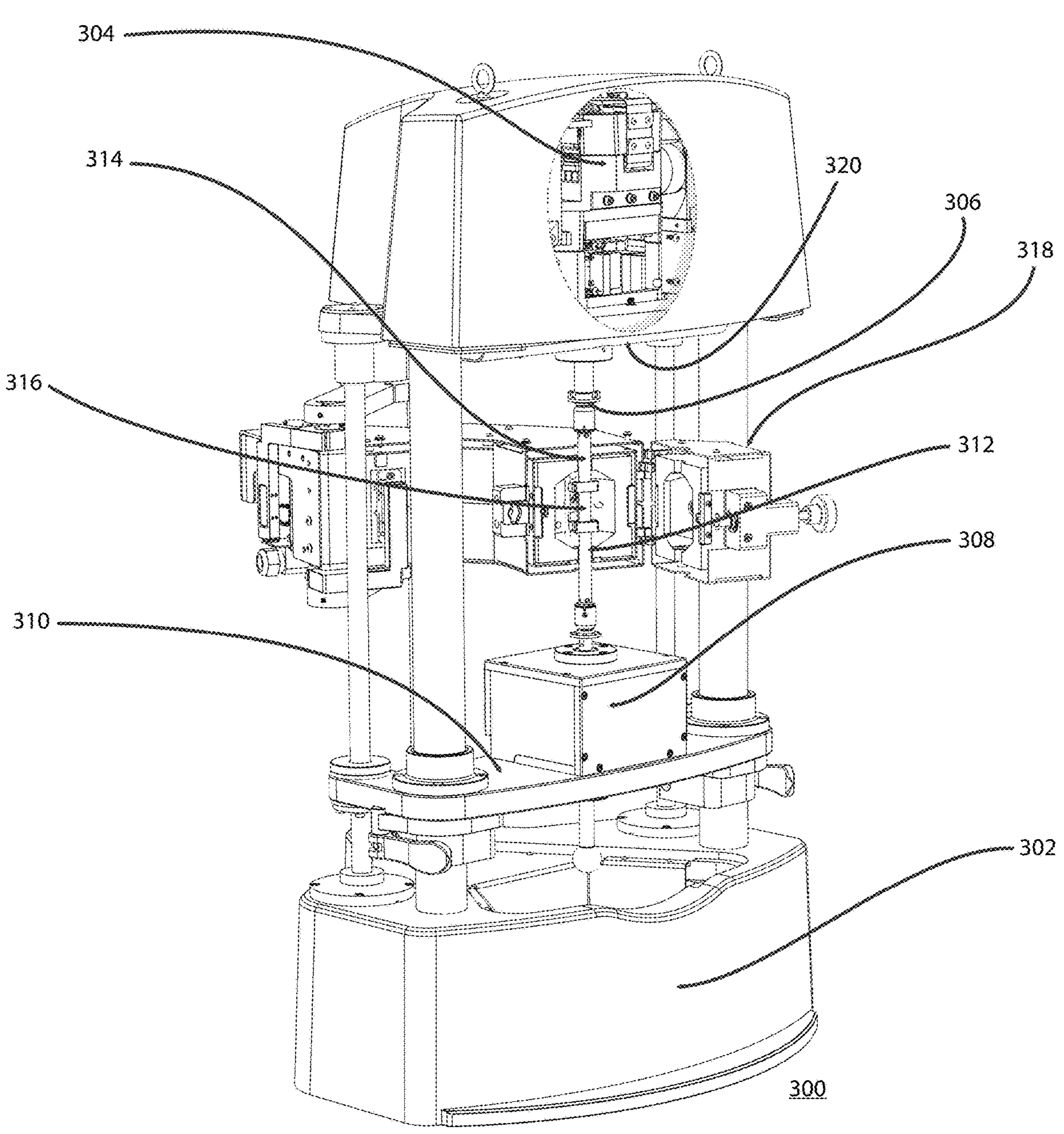
FIG. 3 depicts an example test system in accordance with aspects of the present disclosure.

Referring now to FIG. 3, test system 300, which may be a dynamic mechanical analyzer or other load frame-incorporated test system, is shown. Test system 300 may include frame base 302, actuator assembly 304, actuator output shaft 306, force sensor assembly 308, load reaction assembly 310, lower fixture 312, upper fixture 314, sample 316, environmental chamber 318, and camera location 320. Referring now also to FIG. 1, test system 300 may be in communication with a client system, a server system, and/or a network and may pass test data and imaging data to the client system (e.g., client electronic device 28), the server system (e.g., server computer 20), or the network (e.g., network 22) for further analysis by a processor or other users. The test data and imaging data may be passed from test system 300 to the client system, server system, or network together or separately using one or more communication protocols including, but not limited to USB, Ethernet, Wi-Fi (e.g., IEEE 802.11x), Bluetooth, TCP/IP, cellular (e.g., GSM, CDMA, LTE, 5G . . . ) UDP, GigE, IEEE-1394, MIPI/CSI. In various implementations, MIPI/CSI may be used for direct communication with an imaging device or camera and a processor and the processor may send image data via TCP/IP over Ethernet.

It should be noted that test system 300 is discussed herein for illustrative purposes only and the techniques and features described in the present disclosure may be used with or applied to a variety of test systems in various industries, including but not limited to: dynamic mechanical analyzers, fatigue testing systems, tensile testing systems, load frame incorporated test systems, thermal analyzers, rheometers, tissue engineering systems, and replacement heart valve testing systems.

Figure 4:
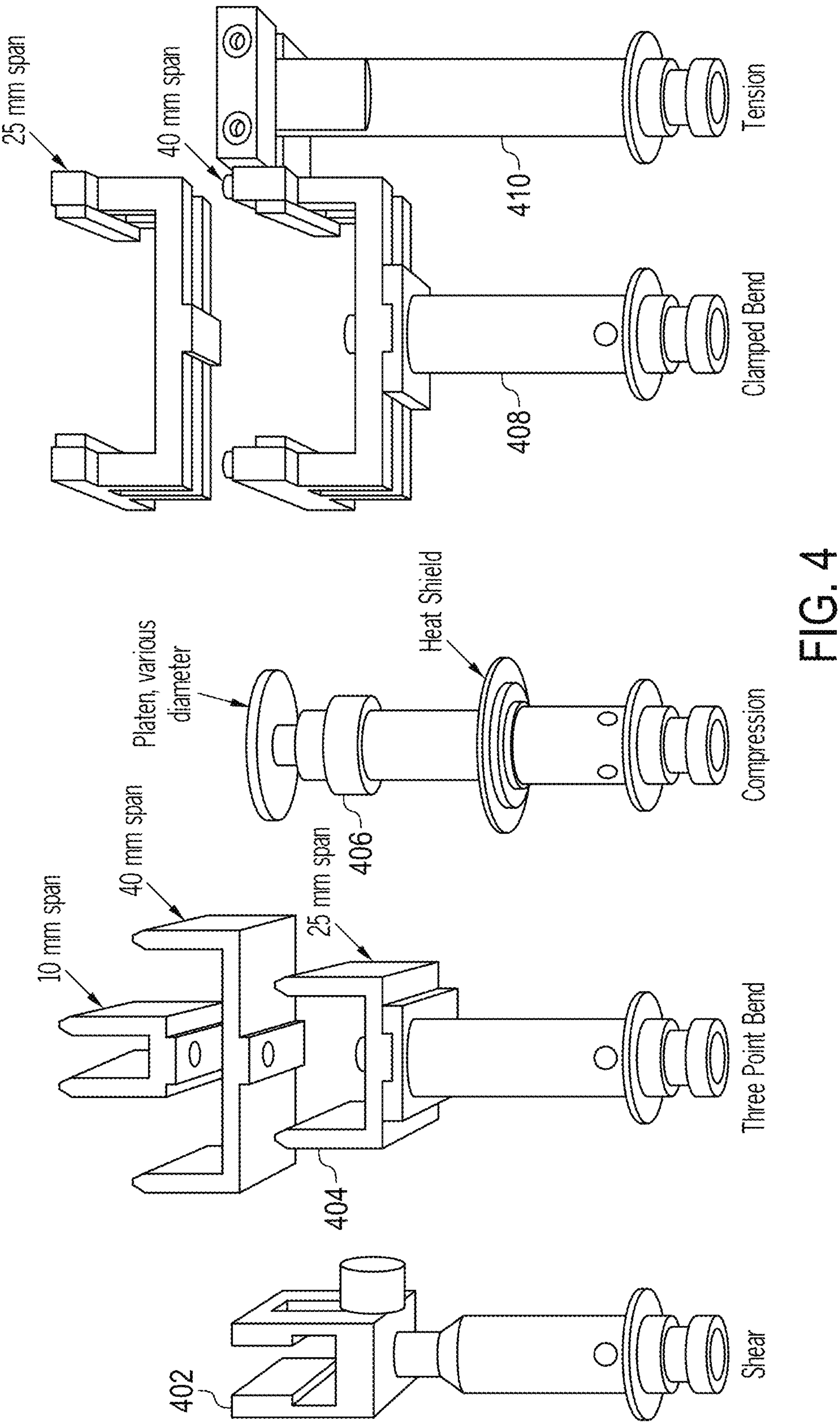
FIG. 4 depicts example fixtures in accordance with aspects of the present disclosure.

Referring now also to FIG. 4, test system 300 may use various fixtures which may be swapped in and out of test system 300 for different test applications. Some fixtures for test system 300 may include shear fixture 402, three point bend fixture 404, compression fixture 406, clamped bend fixture 408, and tension fixture 410. These fixtures, among others, may be swapped in and out of test system 300 depending on the test being run and the sample being tested. The fixtures may have the same or similar connector geometry (e.g., set screw and/or socket) and changing the fixture may take a few minutes.

For example, test system 300 may use a bend type fixture where a strip of sample material may be placed across a U-shaped portion of the bend fixture and the top of the sample material may be pushed in the opposite direction with a point. This configuration may be referred to as a three point bend such as in three point bend fixture 404. Other tests may use compression fixture 406 where, for example, a cylinder of rubber or puck-shaped piece of rubber sample may be placed on a disk and another disk may be applied on top of the sample in the opposite direction. Some tests may use tension fixture 410 where, for example, a rod or strip of sample material may be clamped with grips on opposing sides and pulled apart.

It should be noted that, as discussed above, the techniques and features described in the present disclosure may be implemented with other test systems or systems such as tissue engineering systems, replacement heart valve testing systems and/or heart valve testers, and it should be appreciated that other types of fixtures may be used with those systems. For example, a tissue engineering system may use a platen or well as a fixture on which, or in which, the sample may be placed, and compression may not be applied. Similarly, a heart valve tester may use a fixture involving a mounting ring for a given size and type of heart valve (e.g., a 33 mm mitral valve or a 25 mm aortic valve).

Assume for example that a researcher or other user produced a batch of a polymer or plastic. The researcher may be interested in confirming that the polymer or plastic has the properties that the researcher intended. The researcher may have criteria represented by, for example, a set of curves generated based on a displacement of a reaction force to the polymer or plastic (e.g., from a fixture installed in test system 300). The criteria may also include a stress, strain or modulus.

The researcher, as in many situations, may go to start a test in a test system (e.g., test system 300) on the polymer or plastic, and a fixture may already be installed in the test system. The researcher may not necessarily know which fixture is installed. To run the test to determine if the researcher's criteria for the polymer or plastic have been met, the researcher may need to translate or convert a resulting displacement or load on the polymer or plastic into a modulus value (e.g., a relationship between stress and strain). The researcher may need to know the type of fixture being used in the test system to make a proper conversion and determine the modulus value. Additionally, using an unintended fixture on a sample such as the polymer or plastic may lead to poor results or damage to the test system, the sample, or both.

If the researcher knows that the correct fixture is already installed in the test system, the researcher may proceed to setting up the proper test for the sample of interest. The researcher may open software associated with the test system. The software may have a number of settings or parameters to be entered by a user, or if the same test is run routinely, the software may prepopulate the settings. The researcher may change some of the test parameters such as the size of the polymer or plastic and run the test as usual, using most of the prepopulated settings.

In some test systems, the software operating with the test system may indicate what fixture should be installed for a certain test selected or a user may have to input the fixture installed. For example, the test system may need to know if the installed fixture can support tension-only, compression-only, or bidirectional loading. Attempting to apply a tension load on a compression sample may cause the fixture to lose contact with the sample, which may cause data error, sample damage, or test system damage. Further, having the user input the type of fixture installed (e.g., from a drop-down menu) is a manual step which may leave room for error or inadvertent change.

Continuing with the example above, the researcher may not know what type of fixture is installed in the test system, may assume that the desired fixture is installed in the test system when it is not, or may otherwise make a mistake and have the wrong fixture installed in the test system for the desired test and sample. In these cases, the researcher may input into the software that the desired fixture is installed and run the test with the wrong fixture. For example, the researcher may open a test file that is designed for a bend fixture but a compression fixture may be installed and the researcher may proceed to run the test. This may cause the researcher to waste time using the wrong fixture, obtain erroneous test results while using the wrong fixture, contaminate or ruin the sample while using the wrong fixture, or damage the test system using the wrong fixture.

Thus, it may be desirable for the researcher or other user of the test system to know what type of fixture is installed in the test system without having to manually check the fixture. If the user could more easily know what type of fixture is installed in the test system, various testing errors and test equipment and sample damage may be prevented and the user may be saved from the burden of manually checking what fixture is installed in the test system.

Some test systems may use marking technology, such as RFID tags or QR codes, to provide each fixture with a unique identifier which may then be read by the system to identify the fixture. These systems introduce new hardware requirements to the test system and the fixtures themselves (e.g., RFID tags and readers) while adding complexity and cost to each fixture manufactured. They may also make use of custom fixtures more difficult. Additionally, fixtures can be used over wide temperature ranges (e.g., −150° C.-600° C., or greater) which may make use of marking/tagging technologies more difficult.

Image identification or recognition technologies such as machine learning, deep learning, neural networks may be used to facilitate fixture identification. Images of existing fixtures may be used to identify the type of fixture installed in the test system via an algorithm or framework of algorithms used to categorize the type of fixture shown within the image. Once image identification or recognition has been performed, direct pixel measurements may be used to extract more precise detail about the fixture (e.g., three-point bend span, or tension sample length). Additionally, image identification or recognition technology may make measurements of depth information, which could be used to either improve the fixture identification process (e.g., by isolating the fixture in the image foreground from elements which may be in the image background), or to improve estimates/measurements of sample geometry from the images.

Using the techniques and features described in the present disclosure, image identification or recognition systems may be used to achieve fixture identification in test systems, which may provide several advantages or benefits over existing systems. For example, while one or more imaging devices such as cameras may be needed on the test system, no additional hardware or changes may be required on the fixtures. Further, test systems with fixture identification capability (by image recognition) as described herein may be trained by users to recognize new or different fixtures. Thus, the techniques and features described herein provide a technical solution (i.e., automated fixture identification in test systems) to a technical problem (i.e., manual fixture identification or overlooking fixture identification) and prevent test error and test equipment damage. Additionally, the imaging devices or camera used for these techniques could also be used to provide other benefits to the user, such as motion capture during a test, etc. In other words, the hardware used to implement fixture identification (by image recognition) for test systems may have other uses within the test system.

Figure 2:
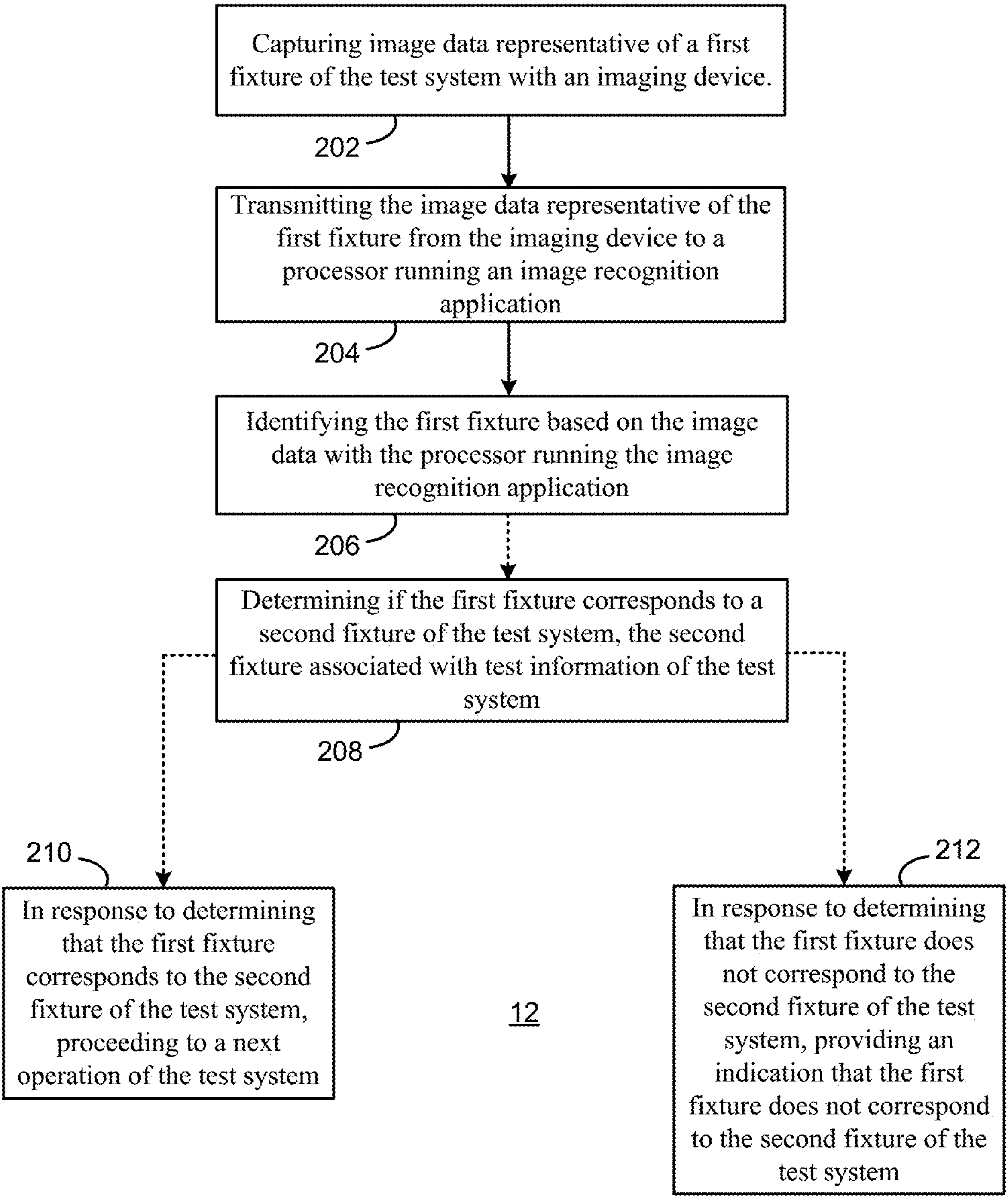
FIG. 2 illustrates an example process for facilitating image recognition in accordance with aspects the present disclosure.

Referring now also to FIGS. 1 and 2, there is shown server applications 10 and client applications 12, 14, 16, and 18. Server applications 10 and/or one or more of client applications 12, 14, 16, and/or 18 may execute one or more processes configured to carry out one or more of the features described herein. Server application 10 may be referred to as a process configured to carry out one or more of the features described herein, such as image recognition process 10. Further, one or more of client applications 12, 14, 16, and 18 may be referred to as a process configured to carry out one or more of the features described herein, such as image recognition processes 12, 14, 16, and/or 18.

Referring now to FIG. 2, an example image recognition process 12 is shown. Image recognition process 12 may include capturing (202) image data representative of a first fixture of a test system with an imaging device. Image recognition process 12 may further include transmitting (204) the image data representative of the first fixture from the imaging device to a processor running an image recognition application. Image recognition process 12 may also include identifying (206) the first fixture based on the image data with the processor running the image recognition application.

The image recognition process may be a server-side process (e.g., server-side image recognition process 10), a client-side process (e.g., client-side image recognition process 12, client-side image recognition process 14, client-side image recognition process 16, or client-side image recognition process 18), or a hybrid server-side/client-side process (e.g., a combination of server-side image recognition process 10 and one or more of client-side image recognition processes 12, 14, 16, 18).

System Overview

Referring to FIG. 1, server-side image recognition process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially. Server computer 20 may be a symbolic representation of a cloud computing site, cloud environment, or cloud platform running multiple servers, computers, or virtual machines. Server computer 20 may execute one or more operating systems, examples of which may include but are not limited to: Microsoft Windows™; Redhat Linux™, Unix, or a custom operating system. For example, server computer 20 may be a symbolic representation of a cloud-based image recognition system or server suitable for performing the operations described in the present disclosure. In an implementation, server computer 20 may be a cloud-based image recognition system or server which may include, store, run, and/or execute image recognition process 10.

The instruction sets and subroutines of server-side image recognition process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side image recognition processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone or smartphone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side image recognition processes 12, 14, 16, 18 which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side image recognition processes 12, 14, 16, 18 and/or server-side image recognition process 10 may be processes that run within (i.e., are part of) a cloud computing site, cloud computing application, cloud platform, or cloud environment. Alternatively, client-side image recognition processes 12, 14, 16, 18 and/or server-side image recognition process 10 may be stand-alone applications that work in conjunction with the cloud computing site, cloud computing application, cloud platform, or cloud environment. One or more of client-side image recognition processes 12, 14, 16, 18 and server-side image recognition process 10 may interface with each other (via network 22 and/or network 26).

Users 44, 46, 48, 50 may access server-side image recognition process 10 directly through the device on which the client-side image recognition process (e.g., client-side image recognition processes 12, 14, 16, 18) is executed, namely client electronic devices 28, 30, 32, 34, for example. Users 44, 46, 48, 50 may access server-side image recognition process 10 directly through network 22 and/or through secondary network 26. Further, server computer 20 (i.e., the computer that executes server-side image recognition process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, 802.11x Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

Image Recognition Process

For the following discussion, client-side image recognition process 12 will be described for illustrative purposes. It should be noted that server-side image recognition process 10 may interact with client-side image recognition process 12 and may be executed within one or more applications that allow for communication with client-side image recognition process 12. However, this is not intended to be a limitation of this disclosure, as other configurations are possible (e.g., stand-alone, client-side image recognition processes and/or stand-alone server-side image recognition processes). For example, some implementations may include server-side image recognition process 10 in place of or in addition to client-side image recognition process 12. The image recognition processes described herein may run through an application or software used for controlling a test system such as test system 300 shown to be in communication with server computer 20, network 22, and client electronic device 28. Additionally, while one or more operations of image recognition processes described herein may be performed or executed by a processor of, for example, a client system (e.g., client electronic device 28) or server system (e.g., server computer 20), other operations of the image recognition process may be performed by other processors or components, including those incorporated with an imaging device such as a camera or another component of an image recognition system.

Referring to FIG. 2, in an embodiment, methods for facilitating image recognition (i.e., for fixture identification in test systems) may be provided and may be implemented via image recognition process 12. Image recognition process 12 may be set to run constantly or may be activated in response to a user engaging with test system 300 or an associated graphical user interface. In an embodiment, image recognition process 12 may capture (202) image data representative of a first fixture (e.g., lower fixture 312 and/or upper fixture 314) of the test system (e.g., test system 300) with an imaging device. The imaging device may be a camera or other imaging device and may be located at camera location 320.

Figure 5:
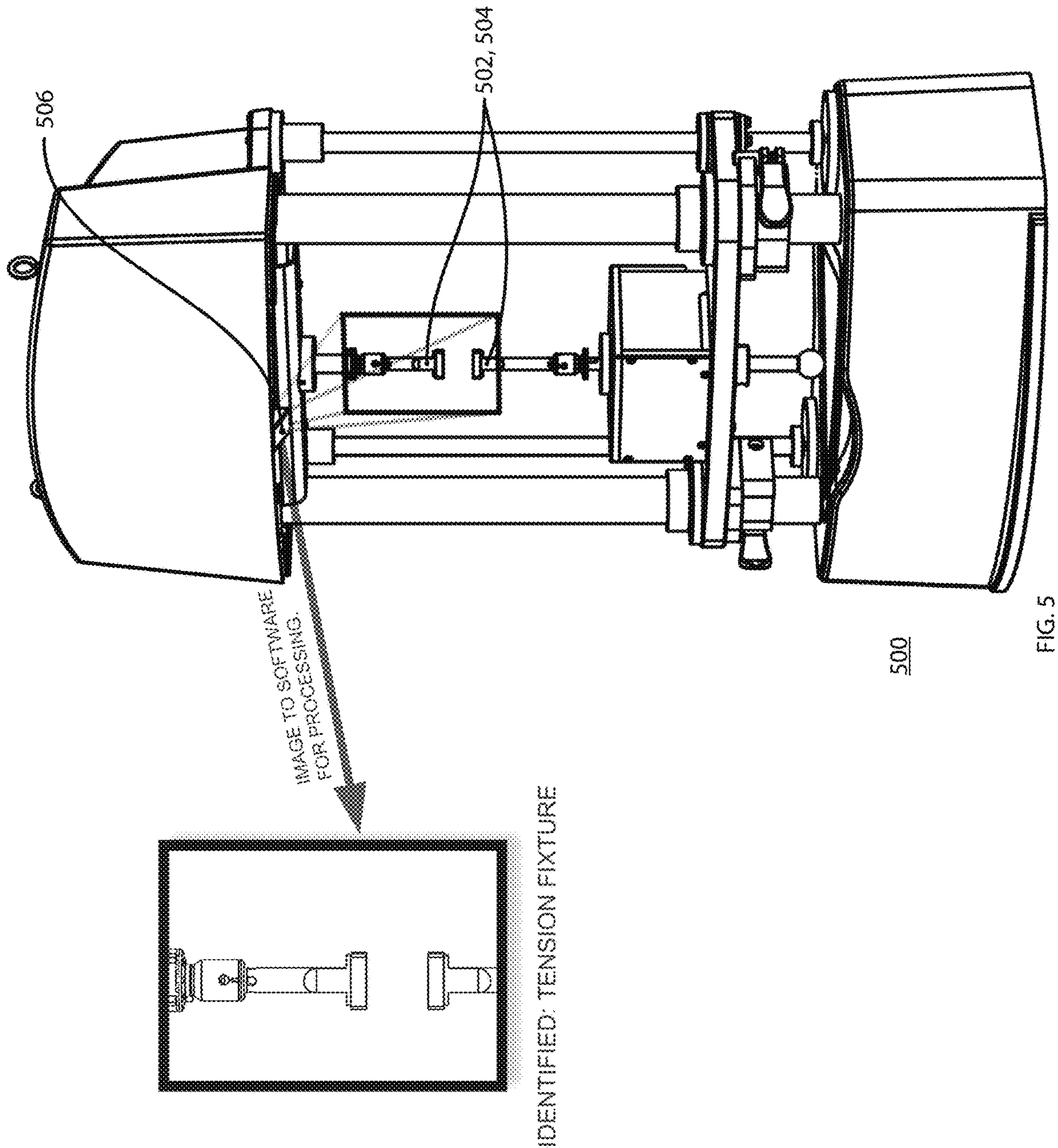
FIG. 5 also depicts an example test system in accordance with aspects of the present disclosure.

For example, referring now also to FIG. 5, test system 500, which may be similar to test system 300 and configured to include any of the techniques or features described in the present disclosure, may include lower and upper fixtures 502 and 504, and may be equipped with camera 506. The imaging device or camera (e.g., camera 506) may be a webcam, smartphone camera-module, or other camera including a camera (or system of multiple cameras) that may provide depth of field (i.e., depth mapping) data with a captured image to isolate the fixture from the background. In various implementations, the imaging device may use light ranges beyond the visible spectrum (e.g., infrared, ultraviolet, x-rays, etc.). As shown, camera 506 may transmit the captured image or image data to a processor or software for processing to identify the fixture. The camera may be mounted such that an installed fixture or fixtures are within a field of view of the camera. The camera may also be mounted such that the installed fixture or fixtures stay within the usable focusing range and/or depth of field of the camera during any adjustment of the test system. For example, a load reaction assembly (e.g., 310) may move up and down relative to the actuator during test set up (but may not typically move during testing).

In various implementations, one or more of the following configurations may be used. A single camera may be mounted to allow upper and lower fixtures to remain within a field of view of the camera (and/or within a focusing range and/or depth of field of the camera) through the normal range of motion of the actuator and the load reaction assembly. An array of two or more cameras may cover the entire focusing range where, for example, several cameras may be fixed to the test system frame and aimed in different locations. One fixed camera (e.g., 506) may be aimed at the upper fixture and another camera may be mounted to the load reaction assembly such that the camera moves with the assembly and is aimed at the lower fixture. The camera may be mounted on a mechanism that allows it to move its field of view from one point to another (e.g., the camera may be mounted to one or more gimbals). The mechanism may be actuated (via an electric motor) and controlled by a computer. One or more cameras fixed on the test system may have lenses attached to flexible fiber optics. The flexible fiber optics can then be moved/positioned to provide the desired view and may be automated with small electromechanical actuators and computer control.

Some test systems may have ovens, environmental chambers, or other enclosures that surround the fixtures during testing. In these systems, the fixtures may be accessible and visible during test set up and a camera may be positioned such that the set up area is visible or such that the camera can view into the enclosure. The enclosures may be harsh environments (e.g., high temperatures or corrosive), however using the flexible fiber optic feature described above, an objective end of the flexible fiber optic may pierce a wall of the enclosure such that the fixture(s) may be visible, with the camera being mounted remotely.

While test systems may often have two fixtures for a test including a lower and upper fixture, the lower and upper fixture may or may not be identical for a given test. In some cases, a lower fixture type may imply a type of fixture needed as the upper fixture for a test. For example, a three point bend fixture installed as a lower fixture will likely have a point contact fixture for an upper fixture. Tension and compression related tests may require tension and compression fixtures, respectively, for both lower and upper fixtures. In most cases, lower and upper fixtures may be a matched set and the lower fixture may have more distinct elements. Thus, if a lower fixture is identified, a proper corresponding upper fixture for a given test can be easily determined. Accordingly, the imaging device or camera may be arranged to be focused on the lower fixture.

Further, image recognition process 12 may transmit (204) image data representative of the first fixture (e.g., lower fixture 312 and/or upper fixture 314) from the imaging device (such as camera 506) to a processor running an image recognition application. The processor may be incorporated with a client system (e.g., client electronic device 28), server system (e.g., server computer 20), or otherwise be accessed over a network (e.g., network 22). As discussed above, the image data may be passed over an interface via one or more communication protocols to a client system or server computer.

Various machine learning models may be configured to analyze images of a typical size, number of pixels, and/or format. Image recognition process 12 may crop, rescale, or reformat an image for combability purposes before transmitting the image to a processor or processing unit. The processor or processing unit may be located with the test system itself or the image may be sent to a client system or server computer for processing. The cropping, rescaling, or reformatting of the image may be performed at the imaging device or camera itself, or at the processor or processing unit.

Image recognition process 12 may identify (206) the first fixture (e.g., lower fixture 312 and/or upper fixture 314) based on the image data with the processor running the image recognition application. The image recognition application may perform one or more operations of the image recognition processes described herein including image recognition process 12. The image recognition application may include an artificial intelligence component, including machine learning, a machine learning model, a neural network, or some combination of these. The machine learning model may reside in memory associated with the processor or processing hardware The machine learning model may be trained at or before installation of the test system 300 and/or the image recognition application or process. A set of training data for the types of fixtures of the test system (e.g., as shown in FIG. 4) may be used to train the machine learning model. The training data may be image data representative of each fixture of the test system. In an implementation, the training data may include 300-1000 images per fixture or about 10-30 s of video @30 fps per fixture. In some cases, 50,000 images or more (about 10,000 images per fixture) may be used. It should be noted that an image set for a fixture may include most or all expected variations of positions and orientations of the fixture. Thus, more complicated systems (e.g., systems with more fixture types, or fixtures which can rotate and may be seen from different angles) may require larger numbers of training data and images.

A variety of different models, tools and languages may be available for machine learning model generation and/or training Once trained, the machine learning model may typically be converted into different formats for different applications. For example, the model may be trained using TensorFlow in Python, but the TensorFlow model may be converted to the ONNX format for native use in Windows code.

The time needed to train the machine learning model may depend on the model selected, and the training code. The training may be significantly accelerated with a graphics processing unit (GPU). For example, training with a 4 core 3.5 GHz Xeon and unsupported GPU may take about 300 minutes/epoch. Training with a 4 core 2.9 GHz i7 laptop, using a CPU may take about 360 minutes/epoch. Training with a 4 core 2.9 GHz i7 laptop using a Nvidia M1200 GPU may take about 30 minutes/epoch. Training with a 4 core 3.5 GHz Xeon using a Nvidia RTX2080 Ti GPU may take about 3 minutes/epoch. The machine learning model may also be trained using cloud resources and/or computing resources from third parties.

Machine learning may incorporate various statistical methods. Groups or clusters of data (e.g., image data) may be identified based on features of the fixture found in the data. A new point may be identified by determining the group or cluster that the point is closest to in geometric distance. Each group may be defined by a multidimensional statistical distribution (e.g., means and standard deviations). For each group there may be a probability that a new point is part of that group. The point may be identified as belonging to the group or cluster with the highest probability.

Figure 6:
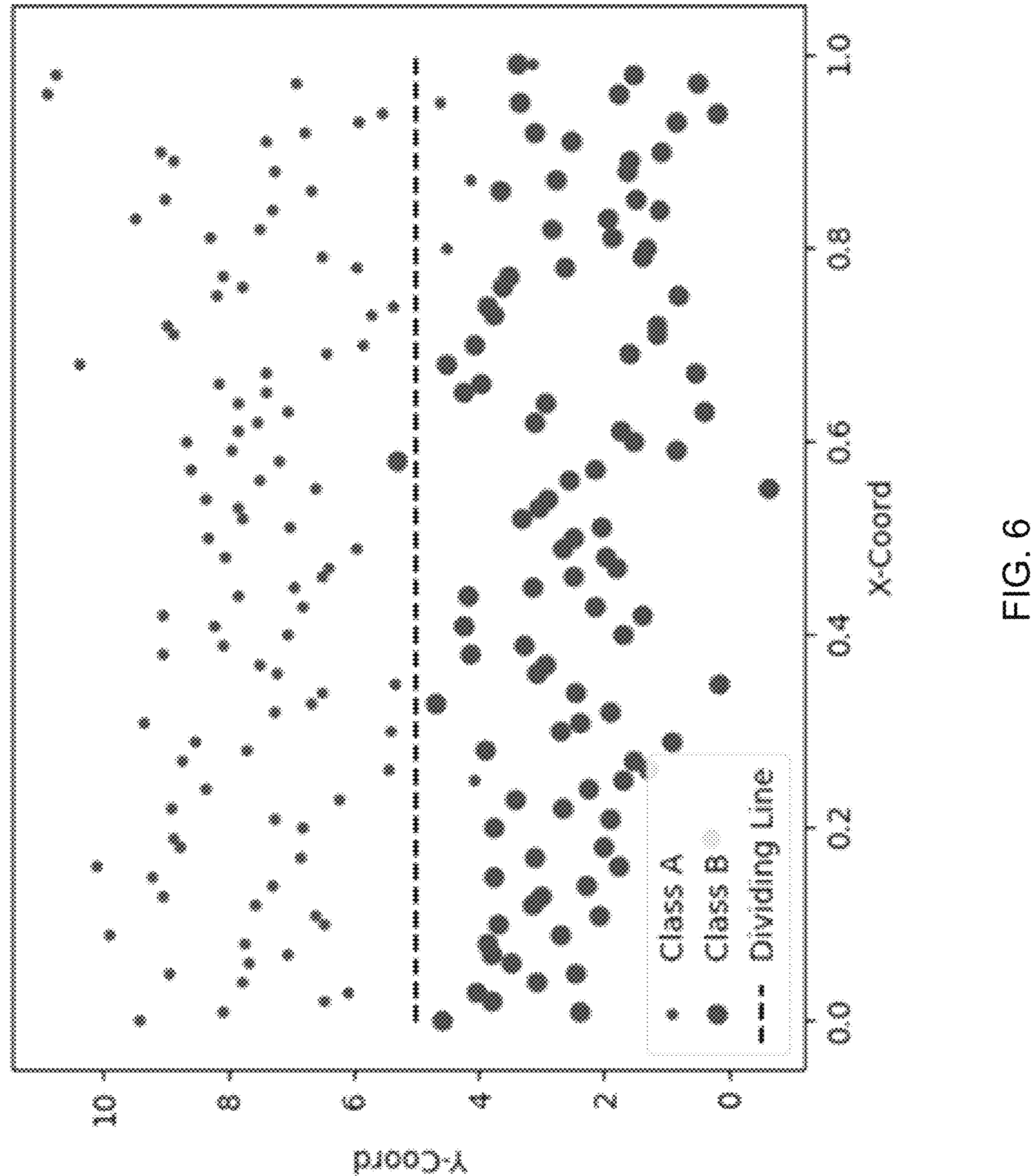
FIG. 6 illustrates an example of classification in accordance with aspects of the present disclosure.

A point in this sense may be an array of pixel values which represents an image of a fixture. A point may be defined by two or three (or more) values. For example, a 2-dimensional point may be a (x, y) pair and a 3-dimensional point may be a (x, y, z) triad (with 1×2 and 1×3 arrays, respectively). Other sequences may be used (e.g., instead of (x, y, z), (×1, ×2, ×3) may be used). Referring to FIG. 6, a simple example of (X,Y) coordinate pairs may be used for classification of two classes: Class A (smaller dots) and Class B (larger dots). Class A may, for example, correspond to the bend fixture class, and Class B may correspond to the compression fixture class. As shown in this example, the range of X values is from 0-1, and the range of Y values is from 0-10. If only X values were known for each point, the classes may be difficult to distinguish. However, when the Y values are added, it can easily be seen that the points where Y>5 are most likely Class A, and those where Y<5 are most likely Class B. This distinction may not work for all points, as some Class A points may be below the Y=5 line and one Class B point may be above it, but using this assessment may allow classification of a new unknown point with a high degree of confidence.

Digital images include a large number of pixels, each defined with a numeric value (or values for a color image). Typical images on computer monitors, phones, or televisions may be made up of millions of points. A smaller image may be a 4×4 pixel, black and white image. A 4×4 pixel, black and white image (e.g., with pixel values from 0-9) may be represented by a 4×4 matrix:

$$\text{image1} = \begin{bmatrix} 1 & 0 & 0 & 1 \\ 2 & 3 & 3 & 2 \\ 0 & 6 & 6 & 0 \\ 0 & 4 & 4 & 0 \end{bmatrix}$$

This 4×4 matrix may be converted into a 1×16 array: image1Array=[1 0 0 1 2 3 3 2 0 6 6 0 0 4 4 0] where, as before with (x, y, z) or (×1, ×2, ×3) coordinates, a point may now be: (×1, ×2, ×3, ×4, ×5, ×6, ×7, ×8, ×9, ×10, ×11, ×12, ×13, ×14, ×15, ×16). Another image may be represented by another 4×4 matrix:

$$\text{image2} = \begin{bmatrix} 0 & 0 & 0 & 0 \\ 0 & 2 & 2 & 0 \\ 0 & 6 & 6 & 0 \\ 0 & 4 & 4 & 0 \end{bmatrix}$$

This 4×4 matrix may also be converted into a 1×16 array: image2Array=[0 0 0 0 0 2 2 0 0 6 6 0 0 4 4 0]

Referring now also to FIG. 7, image1 may be a very pixelated image of a bend fixture and image2 may be a very pixelated image of a compression fixture. The table at the bottom of FIG. 7 shows coordinates x1-x16 corresponding to the two images with noticeable differences. These differences are what a machine learning model may use to detect differences between one fixture and another. Based on this data, a machine learning model may learn that an image, or a point, with >1, ×4, ×5 and ×8 values>0 is likely to correspond to a bend fixture and not a compression fixture.

The image recognition application may alternatively or additionally include one or more neural networks. Neural networks may include multiple layers or nodes including an input layer, hidden layers, and an output layer. In a general sense, a neural network may be a complex mathematical function that takes an input and returns an output. The neural network may be structured in such a way that there are many tunable parameters within a model which can be adjusted (or 'trained') such that a desired output corresponds with a given input. For example, to determine if a fixture is a bend or a compression fixture, an image (or image data) of a compression fixture may be passed as input to the neural network and a trained model may return as output an indication that the image (or image data) corresponds to a compression fixture (e.g., a numeric value corresponding to a compression fixture). The mathematical function may have a general format and may be built in layers, with each layer consisting of one or more nodes.

For example, an input layer may take data in a given data format. One or more middle layers may transfer the data from the input layer and perform various computations (e.g., applying convolution filters of different types). Each layer take an input from the previous layer and pass its output on to the next layer for which its outputs are connected. Each layer may have multiple parameters which may be adjusted during training to make the actual output match the desired output. The number of trainable parameters in the middle layers may be large. For typical models there may be in the rage of 1-5 million trainable parameters, but some models may have even more. Further, an output layer may receive the output after data has been transmitted through the middle layers. The output layer may return the result in a defined format. For example, this may lead to a classification of the image as either a bend or compression fixture.

An image may first be preprocessed to match the input format of a given neural network. Some neural networks used for image identification may use an input size definition of 224×224×3, which may represent a 224×224-pixel image with three color values (red, green and blue). Thus, if the original image was 400×600×3 it may be cropped and rescaled to the 224×224×3 numeric format before being passed to the input layer. The data may then be processed from one layer to the next, with each node applying a different computation, such as a convolution. Each node may pass its output on to nodes in subsequent layers. The outputs of the layers may have abstract dimensions. The final layers may be designed to convert the output into a more useful format. This may be a 1×2 vector, for example, where: (1, 0)=bend; and (0, 1)=compression.

Existing neural networks may incorporate models pre-trained on very large data sets and transfer learning may be used to repurpose these neural networks for use in identifying fixtures. For example, output layers of a neural network may be replaced and retrained to operate with fixture image data. The output layer may be replaced and retrained for use with fixtures of, for example, test system 300 and associated fixtures from FIG. 4.

In an implementation, a logistic regression on a number of images/image data associated with one or more fixtures may be used. A neural network with a transferred learning model (e.g., based on VGG-16) may be trained using many images/image data associated with one or more fixtures in multiple configurations with various backgrounds and may be implemented. Typical validation and training accuracy levels may reach greater than about 99%, which may translate to about 3 errors per year if fixtures are swapped about three times per day. Training accuracy may improve as more images/image data are added to a database associated with the learning model.

In this way, image recognition process 12 may use a trained machine learning model or neural network to identify (206) lower fixture 312 or upper fixture 314 based on the image data. In an embodiment, image recognition process 12 may also determine (208) if the first fixture (e.g., lower fixture 312) corresponds to a second fixture of the test system (e.g., test system 300). The second fixture may be an expected fixture associated with test information of the test system. The test information may represent a type of fixture for use with a particular test or material selected by the user. The first and second fixtures may be the same type of fixture or different types of fixture. For example, the first fixture may be installed in the test system (e.g., from a previous test) and the second fixture may be selected by a user at a graphical user interface (e.g., for a new test). In other words, the first fixture may be an actual, physical, fixture of the test system (e.g., an installed fixture or a fixture otherwise in focus of the imaging device) and the second fixture may not be a physical fixture, but rather a selected, intended, expected, or configured fixture as it relates to the test system software or loaded test file.

Figure 8:
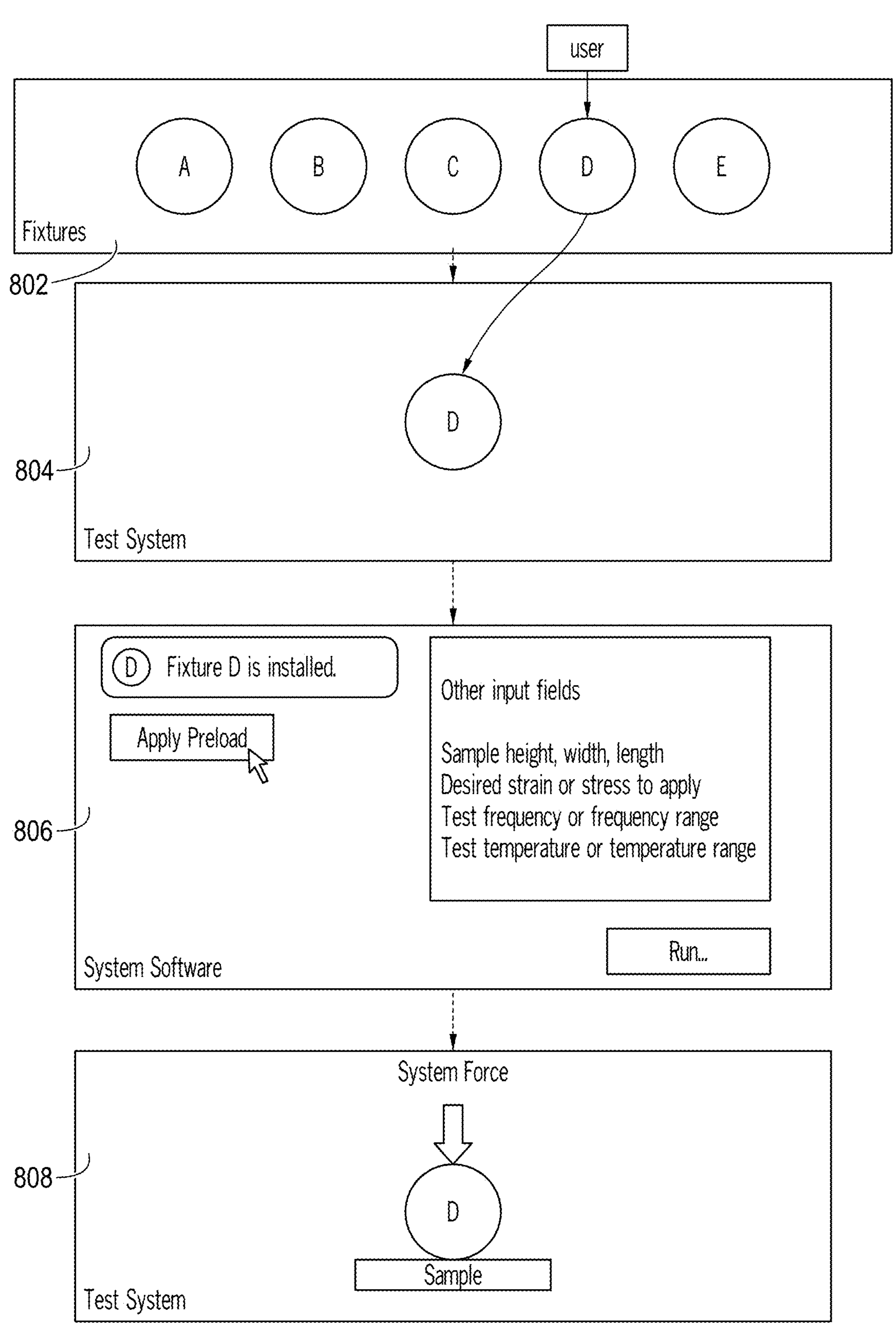
FIG. 8 illustrates an example workflow in accordance with aspects of the present disclosure.

Referring now to FIG. 8, an example workflow associated with the image recognition processes described herein is shown. The workflow may include one or more operations performed by a user or an image recognition process to initiate a test on a test system. A user (e.g., one or more of users 44, 46, 48, and 50) may select (802) a fixture to use with the test system. The fixture may be one of fixtures 402-410 of FIG. 4, corresponding to fixtures A-E, respectively. The user may select, for example, fixture D and install (804) the fixture in the test system (e.g., test system 300). Image recognition process 12, for example, may recognize or identify the fixture using the techniques and features described herein.

A user may interact with test system 300 and/or an associated image recognition application via a graphical user interface accessible from client electronic device 28, for example. The user may setup (806) a test to run via the graphical user interface. As previously discussed, in an implementation, image recognition process 12 may identify the first fixture and also preset or prepopulate various test settings or parameters based in part on the image data representative of the first fixture.

Once the first fixture is identified and compared with the second fixture, further operations by the test system may proceed. For example, in response to determining that the first fixture corresponds to the second fixture of the test system, image recognition process 12 may proceed (210) or allow the test system to proceed to a next operation of the test system. This may include prepopulating various test settings or parameters of the test system, loading a test file of the test system, identifying/indicating that a force sensor of the test system is ready for a tare to be set, applying any preload to the sample, and/or verifying parameters for a predefined test. The test system may also determine a force and/or displacement required (e.g., load applied) based on the fixture type identified for the first fixture and/or a geometry that is input or read from a test file. If the fixture type installed in the test system is wrong for the test file loaded, the load applied may be incorrect.

Once the test system software is configured, the test may run (808) or the user may select run to execute the test or experiment by applying an appropriate force and displacement through the fixture at a desired rate or frequency and temperature. As the test runs, the system may collect force and displacement data and convert the data into stress and strain based on the fixture type and geometry input during the test setup. The stress and strain values may be reported to the user as test results.

In an embodiment, in response to determining that the first fixture (e.g., upper fixture 314 or lower fixture 312) does not correspond to the second fixture (e.g., selected at a graphical user interface associated with test system 300) of the test system, image recognition process 12 may provide an indication that the first fixture does not correspond to the second fixture of the test system. The indication may include a notification on a graphical user interface of the test system.

Figure 9:
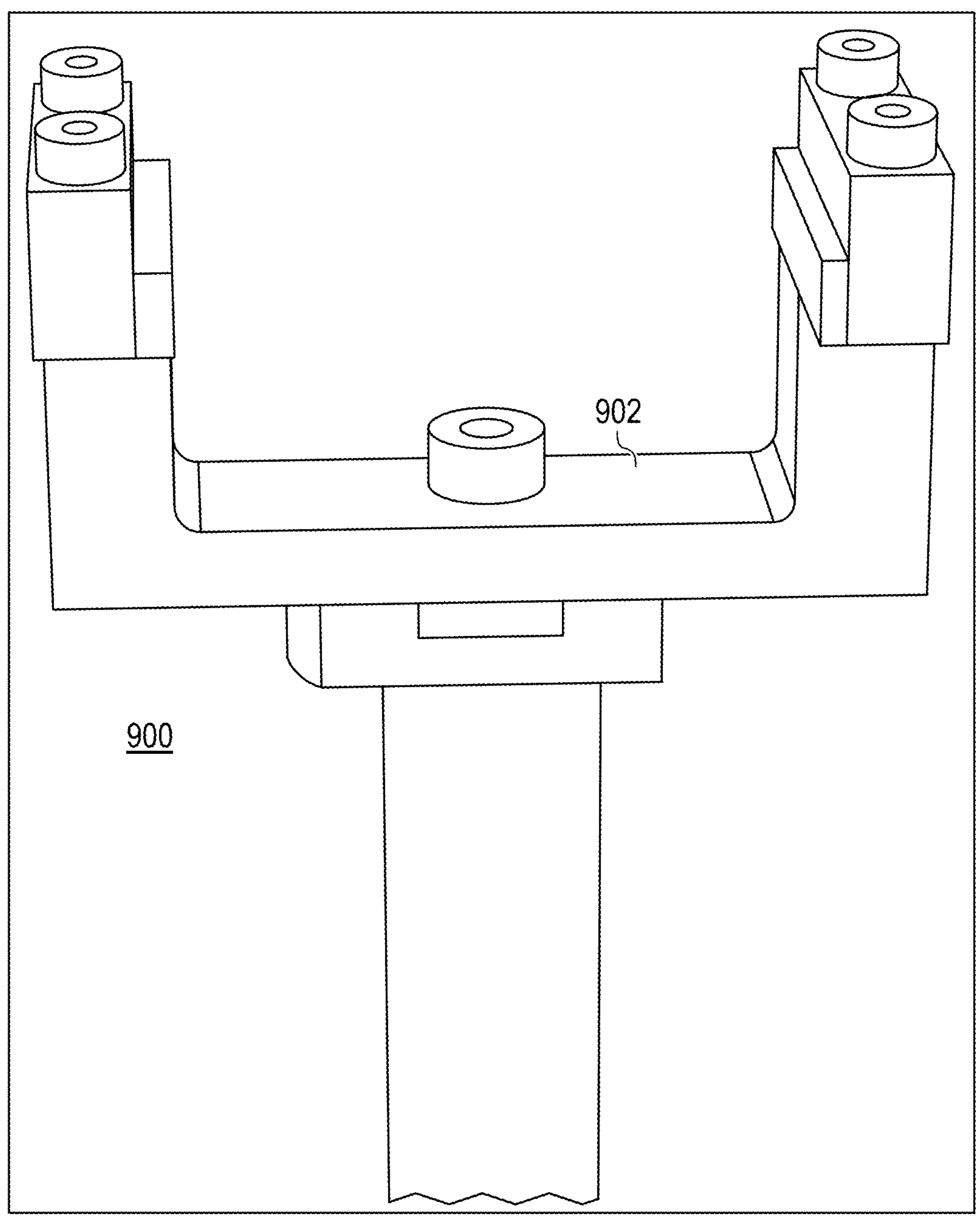
FIG. 9 depicts an example test area of a test system in accordance with aspects of the present disclosure.

Referring now to FIG. 9, an image of an example test area 900 of a test system is shown. Image recognition process 12 may capture (202) image data representative of a first fixture (e.g., fixture 902) of the test system with an imaging device, transmit (204) the image data representative of the first fixture (e.g., fixture 902) from the imaging device to a processor running an image recognition application, and identify (206) the first fixture (e.g., fixture 902) based on the image data with the processor running the image recognition application. As shown in FIG. 9, fixture 902 may be a clamped bend fixture.

Figure 10:
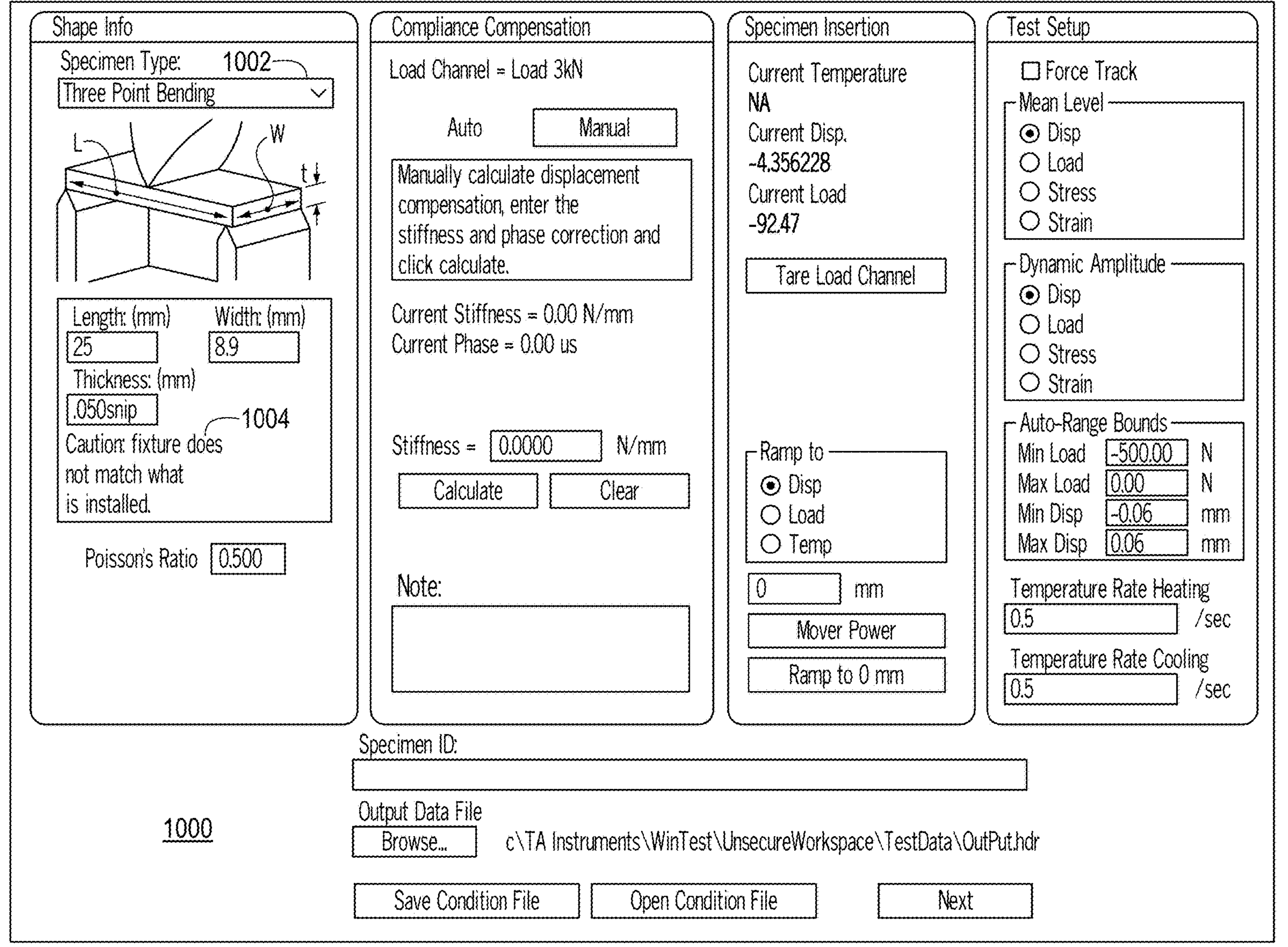
FIG. 10 depicts an example graphical user interface in accordance with aspects of the present disclosure.

Referring now to FIG. 10, an example graphical user interface 1000 of a test system in accordance with the present disclosure is shown. Graphical user interface 1000 may be accessed from, for example, the client electronic device or server computer running the image recognition application (e.g., client electronic device 28). Graphical user interface 1000 may include multiple graphical control elements including check boxes, radio buttons, text fields, drop down menus, etc., which may allow a user to input test information into the graphical user interface. The user may select a fixture (e.g., the second fixture) from, for example, drop down menu 1002 which then may become test information used by image recognition process 12 and/or the test system (e.g., test system 300) to proceed to a next operation. For example, as shown in FIG. 10, the user may select a three point bending fixture (e.g., the second fixture) from drop down menu 1002 as that may be the fixture corresponding to the sample type for which the test is being conducted. The test information may be representative of a fixture type (e.g., the second fixture) corresponding to a test selected for the test system.

Continuing with the example above, image recognition process 12 may determine (208) if the first fixture (e.g., fixture 902, a clamped bend fixture) corresponds to a second fixture (e.g., selected at drop down menu 1002, a three point bend fixture) of the test system. The second fixture (e.g., selected at drop down menu 1002, a three point bend fixture) may be associated with test information (e.g., input at graphical user interface 1000) of the test system. Image recognition process 12 may determine that the first fixture (e.g., fixture 902, a clamped bend fixture) does not correspond to the second fixture (e.g., selected at drop down menu 1002, a three point bend fixture) of the test system. In response to determining that the first fixture (e.g., fixture 902, a clamped bend fixture) does not correspond to the second fixture (e.g., selected at drop down menu 1002, a three point bend fixture) of the test system, image recognition process 12 may provide (212) an indication that the first fixture does not correspond to the second fixture of the test system.

The indication may be provided, for example, via graphical user interface 1000 of the test system. Graphical user interface 1000 may show the indication (e.g., text 1004) that the first fixture (e.g., fixture 902, a clamped bend fixture) does not correspond to the second fixture (e.g., selected at drop down menu 1002, a three point bend fixture). The indication may also be provided in the form of a pop-up window or other graphic indication, or via audio.

As discussed above, identifying fixtures in accordance with the techniques and features described in the present disclosure may be performed with the use of a neural network which may be part of image recognition process 12 or the image recognition application. The neural network may be used for machine learning and may analyze an image or image data as numerical data. The numerical data may be filtered and processed in various ways depending on configuration of the neural network.

For example, one phase or layer of the neural network may apply a convolutional filter to the numerical data. Various image processing techniques may use convolution filters, filter kernels, or other matrix-related mathematical applications for enhancing or detecting various features in images. The convolutional filter may extract features or details of a fixture that lie in a vertical orientation. Another layer of the neural network may detect features or details of a fixture that lie in a horizontal orientation. The neural network may then be trained to learn or recognize a relationship of these features, and associate a certain combination of features with a given fixture type.

Figure 11:
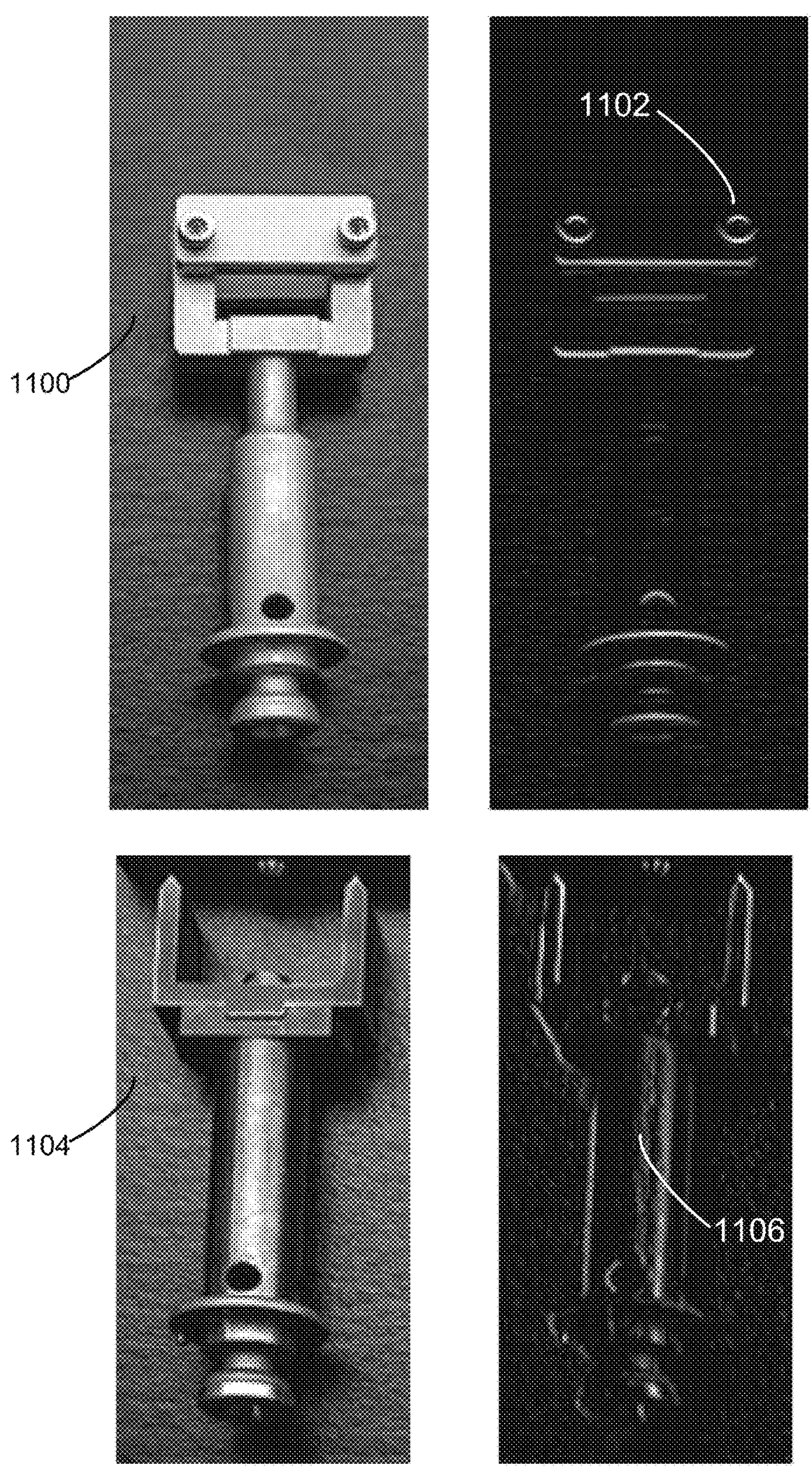
FIG. 11 depicts examples of feature detection in accordance with aspects of the present disclosure.

Referring now to FIG. 11, examples of feature detection in accordance with aspects of the present disclosure are shown. Image 1100 shows a shear fixture associated with underlying image/numerical data as described herein. Image 1102 shows how the shear fixture may appear when viewed after the underlying image/numerical data has been run through a convolution with a filter kernel that may detect horizontal edges. The underlying image/numerical data associated with image 1102 may be used to identify a shear fixture from image data representative of an unknown fixture captured by an imaging device focused on a test area of a test system as described herein.

Similarly, image 1104 shows a three point bend fixture associated with underlying image/numerical data as described herein. Image 1106 shows how the three point bend fixture may appear when viewed after the underlying image/numerical data has been run through a convolution with a filter kernel that may detect vertical edges. The underlying image/numerical data associated with image 1106 may be used to identify a three point bend fixture from image data representative of an unknown fixture captured by an imaging device focused on a test area of a test system as described herein.

Filter kernels may be used to detect other features such as sharp corners and the location of sharp corners in relation to other features. In this way, machine learning models may ultimately learn what features are different from one fixture to another.

FIG. 12 depicts an example implementation in accordance with aspects of the present disclosure. The code shown in FIG. 12 may be adjusted or modified to be implemented via one or more programming languages or software tools (e.g., Mathematica™, Matlab™ and Python™) as a program, function, or application which may be used by or called by image recognition process 12. As shown in FIG. 12, a function may be defined to preprocess an image and prepare the image to be sent to a classifier. The image may be resized to have the required dimensions using, for example, a bicubic resampling function. The image data array may be manipulated into a format that matches a machine learning model input, for example: 1×3×224×224 (1 image×3 colors×224×224 pixels). A function may be called to load a test file based on a classification of the image/fixture. For example, a bend, compression, tension, or shear fixture test file may be loaded. If no fixture is found or the fixture is not identified, a warning that no fixture is in place or has been identified may be provided.

The desired pixel dimensions (only one value may be needed because the image may be expected to be square) may be defined and a trained fixture identification neural network may be loaded. The image of the first fixture (e.g., the installed fixture) may be loaded, from, for example, a file system. The image data for the first fixture may also be passed via another process or returned from a function call. The image and the required input dimensions may be passed to the previously defined image processing function. The image data may be passed to the machine learning model to generate a prediction of what the fixture is (i.e., the first fixture may be identified). If the first fixture matches a second fixture (e.g., the expected or selected fixture), the correct test file for the test system may be loaded. The results may be printed to the screen if desired. If the fixtures do not match, a notification may be provided or a function may be called to take an action (e.g., stop the test).

In an embodiment, image recognition process 12 and or the image recognition application may include one or more operations or features for safe operation of a test system. As previously discussed, image recognition process 12 may capture image data representative of a test area of the test system with an imaging device and also transmit the image data representative of the test area from the imaging device to a processor running an image recognition application. Image recognition process 12 may also detect a user presence (e.g., a hand or finger) in the test area based on the image data with the processor running the image recognition application.

Further, image recognition process 12 may, in response to detecting the user presence in the test area of the test system, adjust the test system to a safe mode (e.g., power off or low power mode). Image recognition process 12 may also, in response to detecting the user presence in the test area of the test system, provide an indication that the user presence has been detected in the test area of the test system. The indication may include a notification on a graphical user interface of the test system. The indication may also include a popup window or an audio alarm. Additionally, image recognition process 12 may detect that the user presence (e.g., a hand or finger) is no longer in the test area based on the image data with the processor running the image recognition application. In response to detecting that the user presence is no longer in the test area of the test system, image recognition process 12 may adjust the test system out of the safe mode.

Software tools/packages such as Mathematica™, Matlab™ and Python™ may be used for implementing machine learning models. Various software may be open source or proprietary.

While the invention has been shown and described with reference to specific embodiments, it should be understood by those skilled in the art that various changes in form and detail may be made therein without departing from the spirit and scope of the invention as recited in the accompanying claims. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for safe operation of a test system, the method comprising:

capturing image data representative of a test area of the test system with an imaging device;

transmitting the image data representative of the test area from the imaging device to a processor running an image recognition application;

detecting, by the image recognition application, a user presence within the test area by identifying a hand or finger of a user within the test area using at least one of a machine learning model and a neural network trained on fixture image data of the test system;

adjusting the test system to a safe mode in response to the detecting the user presence within the test area.

2. The method of claim 1, further comprising providing, by the image recognition application in response to the detecting the user presence within the test area, an indication that the user presence has been detected within the test area.

3. The method of claim 2, wherein the indication is a notification on a graphical user interface of the test system.

4. The method of claim 2, wherein the indication includes an audio alarm.

5. The method of claim 1, further comprising detecting the user presence is no longer within the test area based on the transmitted image data.

6. The method of claim 5, wherein the safe mode comprises at least one of powering off the test system and operating the test system in a lower power mode, the method further comprising adjusting the test system out of the safe mode in response to the detecting the user presence is no longer within the test area.

7. The method of claim 1, wherein the image recognition application comprises at least one of: a machine learning model; and a neural network.

8. The method of claim 1, wherein the test system is selected from the group consisting of: a dynamic mechanical analyzer; a fatigue testing system; a tensile testing system; a load frame incorporated test system; a thermal analyzer; a rheometer; a tissue engineering system; and a replacement heart valve testing system.

9. The method of claim 1, wherein the detecting the user presence within the test area by identifying the hand or finger of the user within the test area comprises using at least one of a machine learning model and a neural network to analyze the image data within the test area as corresponding to the hand or finger of the user.

10. A test system having an identification system, the identification system comprising:

an imaging device focusable on a test area of the test system;

a processor in communication with the imaging device, the processor configured to: run an image recognition application;

receive image data from the imaging device representative of a test area from the imaging device;

detect a user presence within the test area by identifying a hand or finger of a user within the test area using at least one of a machine learning model and a neural network trained on fixture image data of the test system; and adjust the test system to a safe mode in response to the detecting the user presence within the test area.

11. The test system of claim 10, wherein the processor is further configured to provide an indication that the user presence has been detected within the area in response to detecting the user presence within the test area.

12. The test system of claim 11, wherein the indication is a notification on a graphical user interface of the test system.

13. The test system of claim 11, wherein the indication includes an audio alarm.

14. The test system of claim 10, wherein the processor is further configured to detect that the user presence is no longer within the test area based on the received image data.

15. The test system of claim 14, wherein the safe mode comprises at least one of powering off the test system and operating the test system in a lower power mode, wherein the processor is further configured to adjust the test system out of the safe mode in response to detecting the user presence is no longer within the test area.

16. The test system of claim 10, wherein the image recognition application comprises at least one of: a machine learning model; and a neural network.

17. The test system of claim 10, wherein the test system is selected from the group consisting of: a dynamic mechanical analyzer; a fatigue testing system; a tensile testing system; a load frame incorporated test system; a thermal analyzer; a rheometer; a tissue engineering system; and a replacement heart valve testing system.

18. A load frame-incorporated test system including an identification system, the identification system comprising:

a camera focused on a test area of the load frame-incorporated test system;

a processor in communication with the camera, the processor configured to:

run an image recognition application comprising an artificial intelligence component, the artificial intelligence component comprising at least one of: a machine learning model;

and a neural network;

receive image data from the imaging device representative of a test area from the imaging device;

detect a user presence within the test area by identifying a hand or finger of a user within the test area using at least one of a machine learning model and a neural network trained on fixture image data of the test system; and adjust the test system to a safe mode in response to the detecting the user presence within the test area.

19. The load frame-incorporated test system of claim 18, wherein the processor is further configured to provide an indication that the user presence has been detected within the area in response to detecting the user presence within the test area.

20. The load frame-incorporated test system of claim 19, wherein the indication is a notification on a graphical user interface of the test system.

21. The load frame-incorporated test system of claim 19, wherein the indication includes an audio alarm.

22. The load frame-incorporated test system of claim 18, wherein the safe mode comprises at least one of powering off the test system and operating the test system in a lower power mode, wherein the processor is further configured to detect that the user presence is no longer within the test area based on the received image data, and wherein the processor is further configured to adjust the test system out of the safe mode in response to detecting the user presence is no longer within the test area.

* * * * *